(12) United States Patent
Sheth

(10) Patent No.: US 9,379,590 B2
(45) Date of Patent: Jun. 28, 2016

(54) SYSTEMS AND METHODS FOR ELECTRIC MOTOR CONSTRUCTION

(71) Applicant: Baker Hughes Incorporated, Houston, TX (US)

(72) Inventor: Ketankumar K. Sheth, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 306 days.

(21) Appl. No.: 13/975,349

(22) Filed: Aug. 25, 2013

(65) Prior Publication Data

US 2015/0054376 A1   Feb. 26, 2015

(51) Int. Cl.
*H02K 3/30* (2006.01)
*H02K 5/132* (2006.01)
*H02K 3/48* (2006.01)
*H02K 3/34* (2006.01)
*H02K 3/12* (2006.01)
*H02K 9/22* (2006.01)

(52) U.S. Cl.
CPC .................. *H02K 5/132* (2013.01); *H02K 3/48* (2013.01); *H02K 3/12* (2013.01); *H02K 3/30* (2013.01); *H02K 3/34* (2013.01); *H02K 3/345* (2013.01); *H02K 9/22* (2013.01); *Y10T 29/49009* (2015.01)

(58) Field of Classification Search
CPC ........... H02K 5/132; H02K 3/48; H02K 9/22; H02K 3/345; H02K 15/02; H02K 15/085; H02K 3/12; H02K 3/24; H02K 3/30; H02K 3/34; H02K 3/40; H01L 2224/8085; H01L 2224/80855; Y10T 29/49009
USPC .......................................... 310/215, 214, 208
See application file for complete search history.

(56) References Cited

U.S. PATENT DOCUMENTS

| | | | | |
|---|---|---|---|---|
| 4,051,396 A | * | 9/1977 | Berlincourt | F23Q 3/002 310/339 |
| 4,607,183 A | * | 8/1986 | Rieber | H02K 3/487 174/DIG. 20 |
| 6,242,825 B1 | * | 6/2001 | Mori | H02K 3/30 174/127 |
| 6,972,505 B1 | * | 12/2005 | Leijon | H01F 27/288 174/DIG. 20 |
| 2003/0001440 A1 | * | 1/2003 | Bourqui | H02K 3/30 310/43 |
| 2004/0061386 A1 | * | 4/2004 | Amagi | H02K 5/08 310/43 |
| 2006/0284503 A1 | * | 12/2006 | Lin | H02K 5/163 310/90 |
| 2012/0063933 A1 | * | 3/2012 | Rumbaugh | F04B 47/06 417/410.1 |

(Continued)

OTHER PUBLICATIONS

Webpage, http://www.oxforddictionaries.com/us/definition/american_english/granular.*

(Continued)

*Primary Examiner* — Joshua Benitez-Rosario
*Assistant Examiner* — Alexander Moraza
(74) *Attorney, Agent, or Firm* — Law Offices of Mark L. Berrier

(57) ABSTRACT

Systems and methods for constructing a stator for use in downhole equipment such as ESP systems, where granulated filler material is used instead of encapsulants to provide mechanical support to the stator windings, provide electrical insulation in the stator slots, and conduct heat away from the windings. In one embodiment, a stator for an electric motor includes a plurality of laminations stacked together to form a stator core. Stator windings are positioned in slots within the stator core. The stator core and windings are installed in a stator housing, and a solid, granular filler material is used to fill an unoccupied volume within the slots. Retainer fittings are secured to the stator to retain the granulated filler material in the slots.

19 Claims, 5 Drawing Sheets

(56) References Cited

U.S. PATENT DOCUMENTS

| | | | |
|---|---|---|---|
| 2012/0269660 A1* | 10/2012 | Yin | F04B 47/06 417/410.1 |
| 2013/0069478 A1* | 3/2013 | Hamer | H02K 3/30 310/215 |

OTHER PUBLICATIONS

ASTM Committee E20 on Temperature Measurement. (1993). Manual on the Use of Thermocouples in Temperature Measurement (4th Edition): (MNL 12). Section 5.1, p. 111.*

* cited by examiner

SYSTEMS AND METHODS FOR ELECTRIC MOTOR CONSTRUCTION

BACKGROUND

1. Field of the Invention

The invention relates generally to the construction of electric motors, and more particularly to systems and methods for constructing electric motors in which powdered or particulate materials having high thermal conductivity and low electrical conductivity are introduced into the slots of a stator core to support the stator windings and conduct heat away from the windings.

2. Related Art

A typical electric motor has two primary components: a rotor; and a stator. The stator is a stationary component, while the rotor is a movable component which rotates with respect to the stator. In an AC induction motor, a magnetic field is induced into the rotor. The interaction of the magnetic fields created by the stator and the rotor cause the rotor to rotate with respect to the stator.

The motor incorporates electromagnets that generate changing magnetic fields when current supplied to the electromagnets is varied. These electromagnets are normally formed by positioning coils (windings) of insulated wire around ferromagnetic cores. In an AC induction motor, the ferromagnetic cores are formed between "slots" in the stator core. When electric current is passed through the wire, magnetic fields are generated around the wire and consequently in the ferromagnetic cores. Changing the magnitude and direction of the current changes the magnitude and polarity of the magnetic fields generated by the electromagnets.

Electric motors that are designed for downhole applications (such as driving an electric submersible pump) are typically AC induction motors. These motors, generally speaking, are long and narrow. Usually, downhole motors are less than 10 inches in diameter, and they may be tens of meters long. Although the motor can be manufactured in sections, the windings of the stator (or stator sections) are very long, and it may be difficult to keep the windings in place within the stator.

Conventionally, an encapsulant such as an epoxy, varnish or other thermoset material is introduced into the stator slots after the windings are installed. This encapsulant material serves to fill the void that in the slots that are not occupied by the windings, thereby holding the windings in position within the slots. The encapsulant also helps to conduct heat outward from the windings, thereby reducing the operating temperature of the motor. The encapsulant also helps prevent vibrations and rubbing of wires against each other which may result from vibrations.

Conventional encapsulants have a number of disadvantages. For example, the temperatures at which motors are operated in downhole environments are high enough in many applications that the encapsulants begin to break down and their desirable characteristics begin to degrade. Another problem is that conventional encapsulants undergo thermal expansion, so that changes in the temperature of the motor cause the encapsulant to expand and contract to a greater degree than is desirable. Yet another problem with the use of encapsulants in motors is that the encapsulants can hinder or prevent disassembly and repair/remanufacture of the motor, and the components which are in contact with the encapsulants (e.g., the stator laminatons) cannot be reused.

It would therefore be desirable to provide systems and methods for encapsulant-free manufacturing of stators for downhole motors.

SUMMARY OF THE INVENTION

The present invention includes systems and methods relating to the construction of electric motors. Exemplary embodiments of the invention include a stator core for an electric submersible pump motor in which space within the stator, particularly within the slots of the stator, is filled with a granulated filler material. The granulated filler material is packed in this space to provide support to the stator windings so that that they do not move during operation of the motor, as well as to provide electrical insulation and thermal conduction of heat away from the windings.

This encapsulant-free construction may provide a number of advantages over conventional stator construction in which encapsulants are used to hold the stator windings in place within the slots. For instance, encapsulants typically begin breaking down in the high-temperature environments (e.g., 400F and higher) that are found in many wells. This causes the encapsulants to lose their structural and electrically insulating characteristics, which results in reduced reliability and shortened equipment life. Encapsulants also typically undergo greater thermal expansion than granulated materials, so conventional stators are subject to greater stresses from thermal expansion (and corresponding reduced reliability and lifetime) than the present systems. In regard to manufacture of the stator, methods employing granulated filler materials as disclosed herein are much less time consuming than conventional methods, in which it is necessary to cure the encapsulants in the stator for long periods of time (e.g., eight hours). Further, conventional stators that use encapsulants typically cannot be repaired or remanufactured because it is almost impossible to remove the encapsulant from the stator components. Stators manufactured using the present methods, however, can be easily disassembled and repaired, remanufactured or reused because the granulated filler material can be easily removed.

One embodiment comprises a stator for an electric motor. The stator includes a plurality of laminations that are stacked together to form a stator core. A plurality of stator windings are positioned in slots within the stator core. The stator core and windings are installed in a stator housing, and a solid, granular filler material is used to fill an unoccupied volume within the slots. The granulated filler material is packed in the volume and thereby maintains the stator windings in position within the slots. The granulated filler material also conducts heat away from the windings and provides electrical insulation within the slots.

In one embodiment, the granulated filler material has particles that are from 0.006 inches to 0.015 inches in diameter. In this embodiment, the material has a melting point of at least 500° F., a thermal conductivity of at least 1 BTU*ft/(h*ft^2*° F.), a dielectric strength of at least 50 Volt/mil, and thermal expansion which is less than epoxy and varnish. The granulated filler material may be selected from materials such as boron nitride; beryllia; alumina; aluminum nitride; and silicon nitride. In one embodiment, the stator utilizes retainer fittings which are secured to the stator to enclose the volume of the slots and retain the granulated filler material within the slots. The retainer fittings may be designed to enable dielectric oil to flow into and out of the slots while retaining the particles of the granulated filler material in the slots.

An alternative embodiment comprises an ESP motor. The motor includes a stator configured as described above, and a rotor rotatably positioned within the stator.

Another alternative embodiment comprises a method for manufacturing a stator for an ESP motor. In this method, a stator core having a plurality of slots therein is provided. The stator core has slots which accommodate a plurality of magnet windings. The magnet windings are installed in the slots of the stator core. The unoccupied space in the slots of the stator core is filled with a granulated filler material. One or more retainer fittings are secured to the stator core to enclose the volume of the slots and to thereby retain the granulated filler material in the slots. The motor may be filled with dielectric oil, which may enter into and escape from the slots. The granulated filler material, however, is retained in the slots. The stator core may then be installed in an ESP motor.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
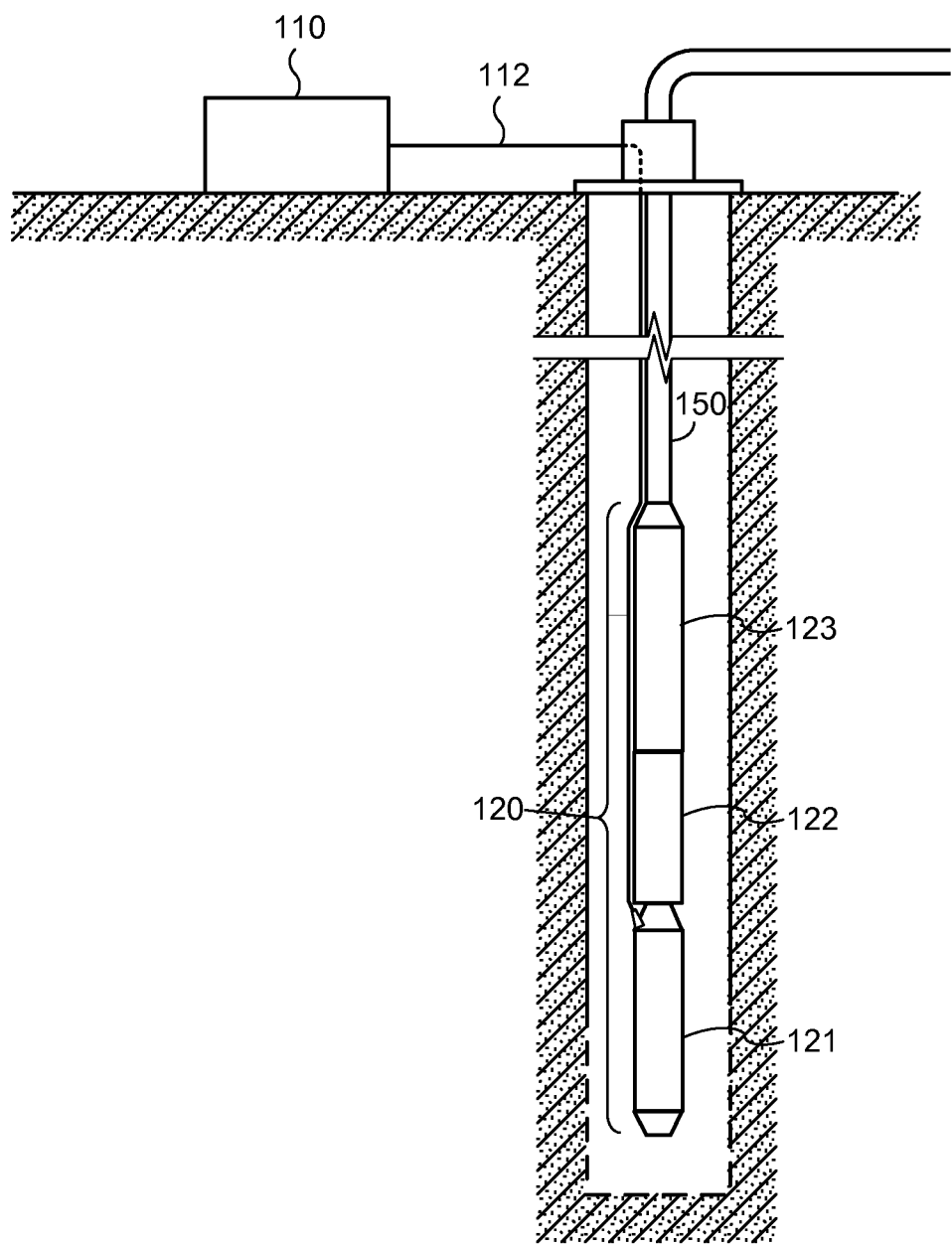
FIG. 1 is a diagram illustrating an exemplary ESP system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for construction of electric motors in which a granular filler material is used to fill the volume in a stator that is conventionally occupied by a solid encapsulant such as epoxy. The granular filler material preferably has a high dielectric strength, high thermal conductivity, a high melting point, and less thermal expansion than epoxy and varnish. The particles of the granular filler material are small enough to enable them to fill the voids in the stator slots, but are large enough that they can be effectively contained within the slots.

The granular filler material occupies the volume of the stator slots and thereby provides mechanical support to the windings within the stator, reducing vibrations and maintaining the stator windings in their positions within the slots. Because there are small voids among the particles of the granular filler material, the effective expansion of the material is less than that of a solid encapsulant, so the motor has fewer reliability problems resulting from thermal expansion. The high dielectric strength of the granular filler material provides electrically insulating properties, while the high thermal conductivity of the material allows it to conduct heat out of the motor.

Referring to FIG. 1, a diagram illustrating an exemplary ESP system in which one embodiment of the present invention may be installed is shown. In this embodiment, an ESP system is installed in a well for the purpose of producing oil, gas or other fluids. An ESP 120 is coupled to the end of tubing string 150, and the ESP and tubing string are lowered into the wellbore to position the ESP in a producing portion of the well (as indicated by the dashed lines at the bottom of the wellbore). Surface equipment that includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

ESP 120 includes a motor section 121, seal section 122, and pump section 123. ESP 120 may include various other components. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112. Power cable 112 extends downward along the tubing string from the drive unit at the surface of the well to the ESP.

Figure 2:
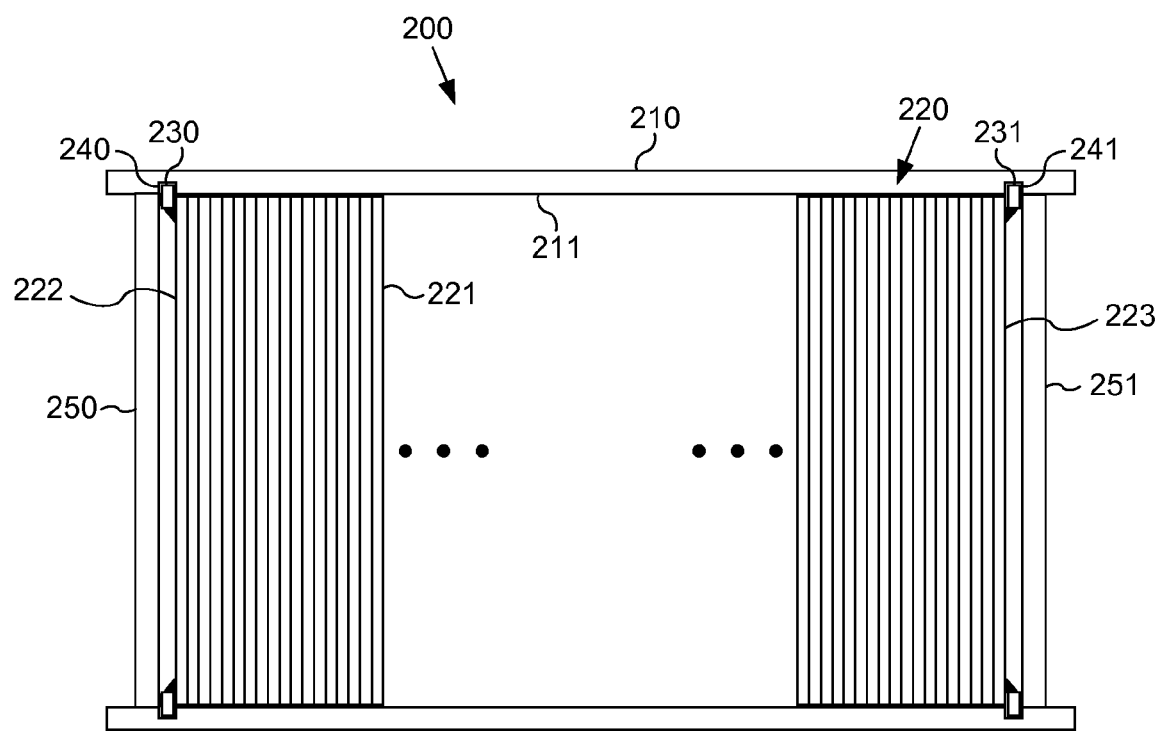
FIG. 2 is a diagram illustrating the general structure of a stator core in one embodiment.

Referring to FIG. 2, a diagram illustrating the stacked-lamination construction of a stator core for a downhole motor in accordance with one embodiment is shown. FIG. 2 depicts the structure of a stator core 200. Stator core 200 includes a tubular stator housing 210 and a stack 220 of laminations (e.g., 221) that are positioned within the housing. The laminations are typically made of a ferro-magnetic material such as steel.

The laminations of the stator core may be identical, although this is not necessarily the case. The laminations may be made of the same material, or some of them may be made of different materials, particularly in rotating bearing areas. In the embodiment of FIG. 2, a pair of snap rings 230 and 231 are positioned at the ends of stack 220. Snap rings 230 and 231 are seated within corresponding grooves 240 and 241 in the inner surface 211 of housing 210. In this embodiment, the laminations (222, 223) at the ends of stack 220 are welded to snap rings 230 and 231. End closures 250, 251 are provided to enclose the volume that is conventionally filled by an encapsulant, thereby serving as retainer fittings that retain the granular filler material in the stator (as will be described in more detail below).

It should be noted that FIG. 2 is simply intended to show the stacked-lamination construction of the stator core, so it does not depict such features as the central bore of the stator core, in which the rotor of the motor is positioned, and the slots of the stator core, in which the magnet windings of the stator are installed. These features will be shown and described below.

Figure 3:
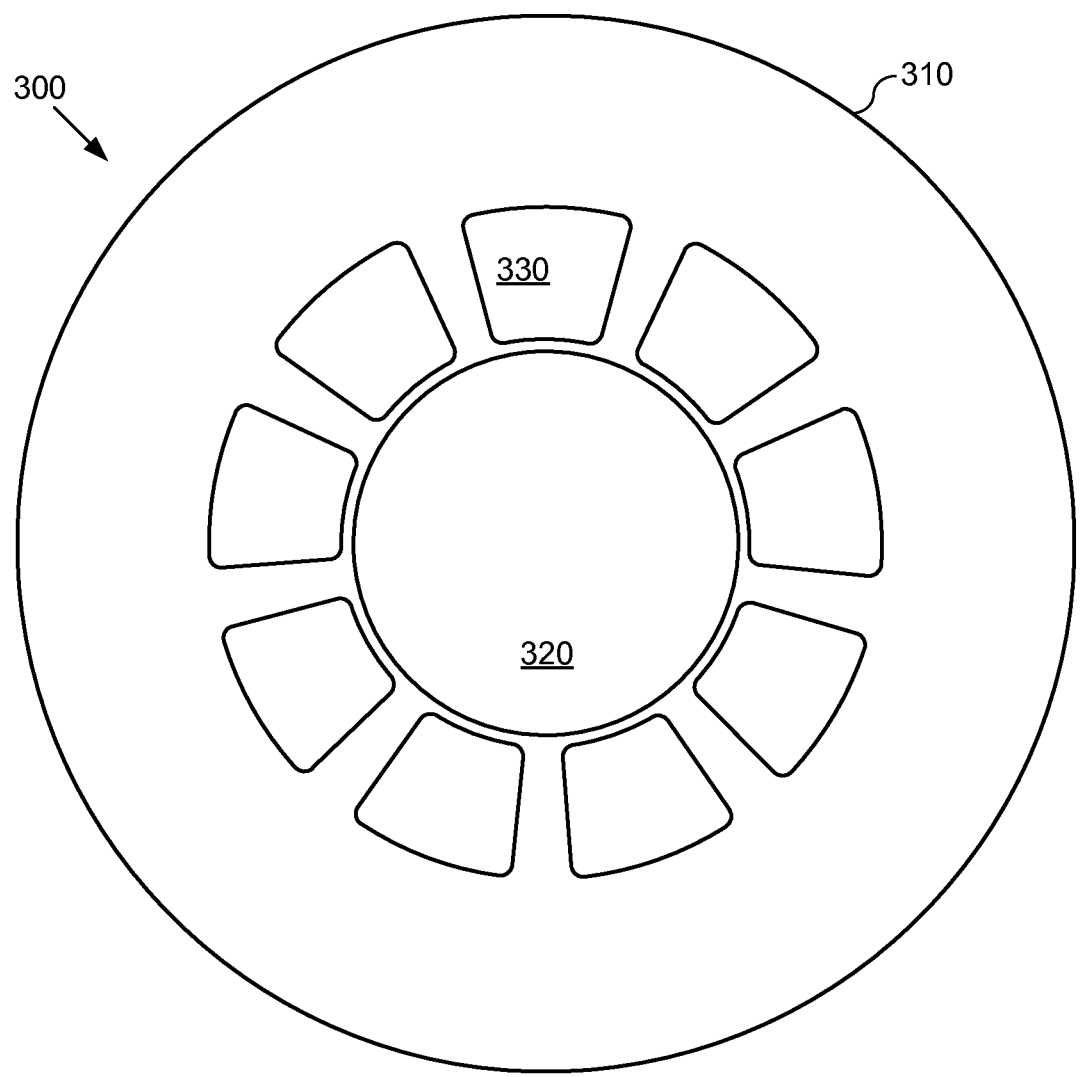
FIG. 3 is a diagram illustrating the configuration of a lamination for a closed-slot stator core in one embodiment.

Referring to FIG. 3, a lamination suitable for use in a stator core is shown. Each lamination is a thin disk of steel or other ferromagnetic material which has the shape of a cross-section of the stator core. The laminations normally have a thin layer of varnish or other non-conductive material which separates the laminations when they are stacked together.

Lamination 300 is generally annular, having a circular outer edge 310 and an inner aperture 320. When multiple laminations are stacked together, the outer edges of the laminations form a cylindrical outer surface of substantially the diameter as the inner surface 211 of stator housing 210. The inner apertures of the stacked laminations form the bore of the stator, within which the rotor of the motor will be positioned in the assembled motor.

Lamination 200 is configured to form a closed-slot stator core. In an alternative embodiment, open-slot laminations in which the slots are open to the bore can be used. This type of stator core has a set of passageways or "slots" which extend through the stator core. Magnet wire will later be threaded through these slots to form stator windings. Lamination 200 therefore includes a plurality of slot apertures (e.g., 330) that will form slots of the stator core.

To construct the stator, a set of laminations such as the one shown in FIG. 3 are stacked together and pressed into a stator housing. The apertures (320, 330) through the laminations form passageways through the stack. Apertures 320 form the bore of the stator into which the rotor will be inserted. Apertures 330 form the slots in which the windings of the stator will be positioned.

After the stack of laminations is pressed into the stator housing, slot liners (e.g., 460 in FIG. 4) are installed in each of the slots (330 in FIGS. 3 and 430, 431, 423 in FIG. 4) to provide a layer of insulation that prevents the passage of stray currents to the stator from the magnet wires. Additionally, the slot liners provide a lubrication barrier that facilitates installation of magnet wires through the slots. Then windings are installed in the slots. In this embodiment, the slots are closed, so the magnet wire that forms the windings must be threaded through the slots. Typically, a single wire is threaded in a first direction through a first one of a pair of slots, then the wire is threaded through the second one of the pair of slots in the opposite direction. This is repeated until a desired number of loops (turns) of wire have been installed in the slots. The combined turns form a winding. The same procedure is used to install additional windings in other pairs of the slots.

Figure 4:
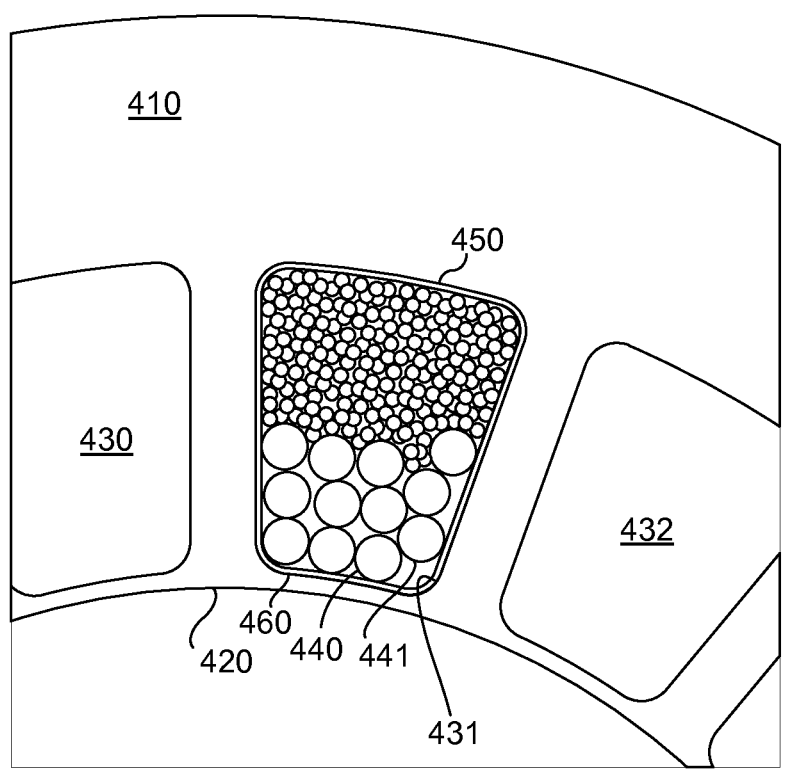
FIG. 4 is a diagram illustrating the manner in which the magnet wires and granular filler material fill the space within each slot of the stator in accordance with one embodiment.

The space within the slots is not all occupied by the magnet wire. The remaining space is conventionally filled with encapsulant. In the present systems and methods, the remaining space is filled with a granular filler material. This is illustrated in FIG. 4. Although the wires and granular filler material are depicted in only one of the slots, it should be understood that the other slots will also be occupied by magnet wires and granular filler material in the same manner.

FIG. 4 shows the manner in which the magnet wires and granular filler material fill the space within each slot of the stator. Each of the laminations (e.g., 410), as explained above, has a first aperture (e.g., 420) which forms a bore to accommodate a rotor, and a set of apertures (e.g., 430-432) which form the slots of the stator. Because apertures 430-432 form part of corresponding stator slots, the same reference number will be used in the description of this figure to refer to both the aperture and the corresponding slot.

In FIG. 4, a plurality of turns of magnet wire (e.g., 440, 441) are positioned in slot 431. A single wire is threaded through slot 431 multiple times to form the multiple turns. Each of the turns of wire is positioned as close to the bottom of the slot (the part closest to bore 420) as possible. After all of the desired turns of wire have been installed in the slot, there remains some space in the slot. Because it is necessary to have some room in the slot to thread the wire through it without damaging the wire, it is not possible, as a practical matter, for the slot to be entirely filled by the wire. While the turns are held in place at the ends of the stator by the portion of the wire that extends from one slot to another, the portion of the wire within each slot may move if movement is not prevented. This movement may damage the wire. The space not occupied by the wire therefore needs to be filled in order to prevent damage to the wire.

As depicted in FIG. 4, the space not occupied by the wire is filled with a granular filler material 450. The particles of granular filler material 450 are sufficiently closely packed that they do not shift or settle after assembly of the stator. Granular filler material 450 is retained in the slots by retainer plates or other fittings that are positioned at the ends of the stator and secured to the stator housing. The particles of the granular filler material are small enough that they can effectively fill the remaining space in the stator slots, but are large enough that they can be contained within the slots by the retainer fittings. The particles may, for example, be between approximately 0.003 inches and 0.025 inches in diameter.

The granular filler material has a melting point which is sufficiently high to allow the material to retain its granular form at the high temperatures that may be experienced by the stator. In one embodiment, the granulated filler material has a minimum melting point temperature of at least 500° F.

The granular filler material is made of a material that has high dielectric strength so that that the filled space in the slots is electrically insulated. In one embodiment, the dielectric strength of the granulated filler material is at least 50 Volt/mil. Typically, when a downhole electric motor is assembled, it is filled with dielectric oil. The retainer fittings allow the oil to enter the slots and fill the spaces between the particles of the granular filler material. The dielectric oil can also escape the slots through the retainer fittings when the temperature of the motor increases and the oil expands. The particles of the granular filler material, however, are retained in the slots by the retainer fittings.

In addition to having a high dielectric strength, the granular filler material should have a high thermal conductivity. In one embodiment, the thermal conductivity of the granulated filler material is at least $1 \text{ BTU*ft}/(\text{h*ft}^2 \text{*° F.})$. This allows the granular filler material to conduct heat through the slots, away from the center of the motor. The efficient conduction of heat out of the motor reduces the operating temperature of the motor and increases the reliability and operating life of the motor. Suitable materials may include boron nitride, beryllia, alumina, aluminum nitride and silicon nitride. Still other materials may be suitable as well.

Figure 5:
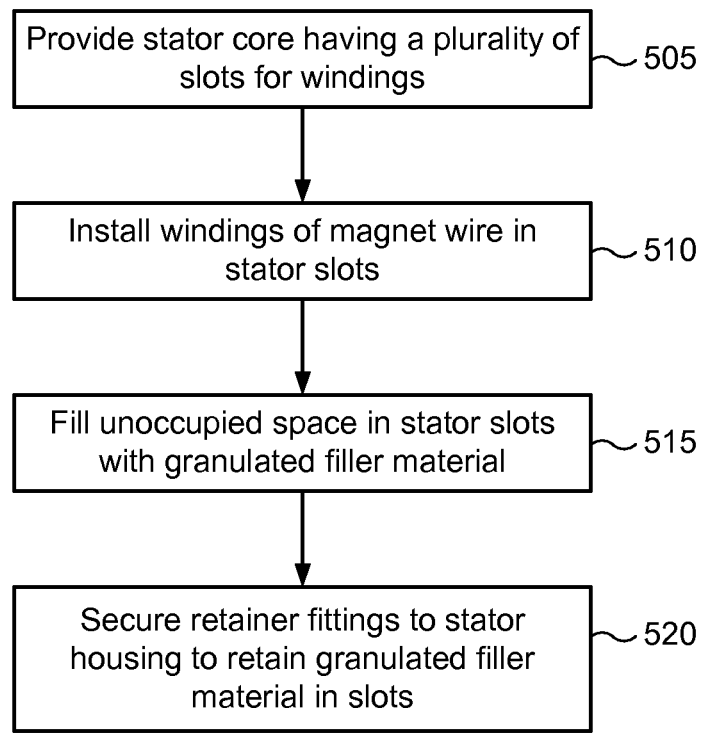
FIG. 5 is a flow diagram illustrating a method for constructing a stator in accordance with one embodiment.

The foregoing description is directed primarily to apparatus embodiments (e.g., stators, motors and ESP systems). Alternative embodiments may include methods for constructing such apparatus. For instance, an exemplary method is depicted in FIG. 5. FIG. 5 shows a flow diagram illustrating a method for constructing a stator in accordance with one embodiment. In this embodiment, a stator core is provided (505). The stator core may for example, be formed by stacking a plurality of annular laminations and then pressing the cylindrical stack of laminations into a stator housing. The stator core has a plurality of slots that are formed therein to accommodate windings of magnet wire.

At step 510, the windings of magnet wire are installed in the slots of the stator core. In one embodiment, the slots are enclosed, so the windings of magnet wire are installed by threading the magnet wire through the slots. Typically, a single magnet wire is threaded through a corresponding pair of the slots a plurality of times. Each loop of the wire through the pair of slots forms one of the turns of the winding. This is repeated for each of the plurality of windings.

After the windings have been installed in the slots of the stator, there remains some unoccupied space in each of the slots. The unoccupied space is filled with granulated filler material (515). The granulated filler material provides support to the windings to keep them in place within the slots.

The granulated filler material also provides a dielectric barrier while at the same time serving to conduct heat away from the windings.

For the purposes of this disclosure, the term "unoccupied space", or "remaining space" will refer to the portion of the space in the stator, primarily within the slots, that is not occupied by the windings and will be filled with the granulated filler material. These same terms will be used to refer to this space, whether the space has been filled with granulated filler material or not.

Retainer fittings are secured to the stator core to enclose the unoccupied space (520). The granulated filler material is packed in the unoccupied space to ensure that the granulated filler material does not shift after the unoccupied space is enclosed by the retainer fittings. The granulated filler material may be packed in any suitable manner, such as by vibrating the material and allowing it to settle into a closely packed arrangement of the filler particles. With the retainer fittings in place, the stator can be assembled with a rotor in the completed motor. Typically, the motor will be filled with dielectric oil. This oil may be allowed by the retainer fittings to enter the unoccupied space in the slots and to escape from the slots, but the retainer fittings will retain the particles of the granulated filler material in the slots. The motor can then be installed in an ESP system and operated in a conventional manner.

An alternative embodiment may comprise a method for disassembling a motor that has a stator as described above. In this method, the motor is removed from the system in which it is installed, and the stator is removed from the motor. The retainer fittings are removed from the stator, which in turn allows the granulated filler material to be removed from the unoccupied space in the stator slots. Because the stator windings and laminations are not encapsulated in epoxy or another encapsulant material, the windings can be easily removed from the slots. Similarly, the stack of laminations can be removed from the stator housing, and the individual laminations can be separated from each other. The stator can therefore be repaired or remanufactured, or the stator components can be reused in another stator. None of these options are practical in a stator that is manufactured using encapsulants because of the difficulty (or even impossibility) of removing the encapsulant from the components.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A stator for an electric motor comprising:
   a plurality of laminations that are stacked together to form a stator core;
   a plurality of stator windings positioned in slots within the stator core;
   a stator housing, wherein the stator core and windings are positioned within the stator housing;
   a solid, granular filler material which fills a volume within the slots, wherein the granulated filler material is packed within the volume and thereby maintains the stator windings in position within the slots;
   wherein the granular filler material is free of hardening encapsulant materials, wherein the hardening encapsulant materials include epoxy, varnish and thermoset materials.

2. The stator of claim 1, further comprising a plurality of slot liners, wherein each slot liner is positioned against a wall of a corresponding one of the slots, and wherein the slot liner provides a layer of insulation between the slot wall and the stator winding positioned in the slot.

3. The stator of claim 1, wherein the granulated filler material is selected from the group consisting of: boron nitride; beryllia; alumina; aluminum nitride; and silicon nitride.

4. The stator of claim 1, wherein the granulated filler material comprises only particles having diameters from 0.006 inches to 0.015 inches.

5. The stator of claim 1, wherein the granulated filler material has a thermal conductivity of at least 1 BTU*ft/(h*ft^2*° F.), a dielectric strength of at least 50 Volt/mil, and a melting point of at least 500° F.

6. The stator of claim 1, wherein the plurality of stator windings are free of hardening encapsulant materials.

7. An electric submersible pump motor comprising:
   a stator; and
   a rotor rotatably positioned within the stator;
   wherein the stator includes
      a plurality of laminations that are stacked together to form a stator core;
      a plurality of stator windings positioned in slots within the stator core;
      a stator housing, wherein the stator core and windings are positioned within the stator housing;
      a solid, granular filler material which fills a volume within the slots, wherein the granulated filler material is packed within the volume and thereby maintains the stator windings in position within the slots;
   wherein the granular filler material is free of hardening encapsulant materials, wherein the hardening encapsulant materials include epoxy, varnish and thermoset materials.

8. The electric submersible pump motor of claim 7, further comprising a plurality of slot liners, wherein each slot liner is positioned against a wall of a corresponding one of the slots in the stator core, and wherein each slot liner provides a layer of insulation between the corresponding slot wall and the corresponding stator winding positioned in the slot.

9. The electric submersible pump motor of claim 7, wherein the granulated filler material comprises only particles having diameters from 0.006 inches to 0.015 inches.

10. The electric submersible pump motor of claim 7, wherein the granulated filler material has a thermal conductivity of at least 1 BTU*ft/(h*ft^2*° F.), wherein the granulated filler material has a dielectric strength of at least 50 Volt/mil and wherein the granulated filler material has a melting point of at least 500° F.

11. The electric submersible pump motor of claim 7, wherein the plurality of stator windings are free of hardening encapsulant materials.

12. A method comprising:
providing a stator core having a plurality of slots therein which accommodate a plurality of magnet windings;
installing the plurality of magnet windings in the plurality of slots;
filling an unoccupied space in the slots with a granulated filler material, wherein the granular filler material is free of hardening encapsulant materials, wherein the hardening encapsulant materials include epoxy, varnish and thermoset materials; and
enclosing the slots and retaining the granulated filler material in the slots.

13. The method of claim 12, further comprising installing a plurality of slot liners in the plurality of slots, wherein each slot liner is positioned against a wall of a corresponding one of the slots in the stator core, and wherein each slot liner provides a layer of insulation between the corresponding slot wall and the corresponding stator winding positioned in the slot.

14. The method of claim 12, further comprising installing the stator core in a motor.

15. The method of claim 14, further comprising filling the motor with dielectric oil, wherein the dielectric oil is able to enter into and escape from the slots while the granulated filler material is retained in the slots.

16. The method of claim 12, wherein the granulated filler material is selected from the group consisting of: boron nitride; beryllia; alumina; aluminum nitride; and silicon nitride.

17. The method of claim 16, wherein the granulated filler material comprises only particles having diameters from 0.006 inches to 0.015 inches.

18. The method of claim 17, wherein the granulated filler material has a melting point of at least 500° F., wherein the granulated filler material has a thermal conductivity of at least 1 BTU*ft/(h*ft^2*° F.) and wherein the granulated filler material has a dielectric strength of at least 50 Volt/mil.

19. The method of claim 12, wherein the plurality of stator windings are free of hardening encapsulant materials.

* * * * *